(Model.)
J. M. HAMBLIN.
MOWING MACHINE KNIFE.
No. 305,813. Patented Sept. 30, 1884.
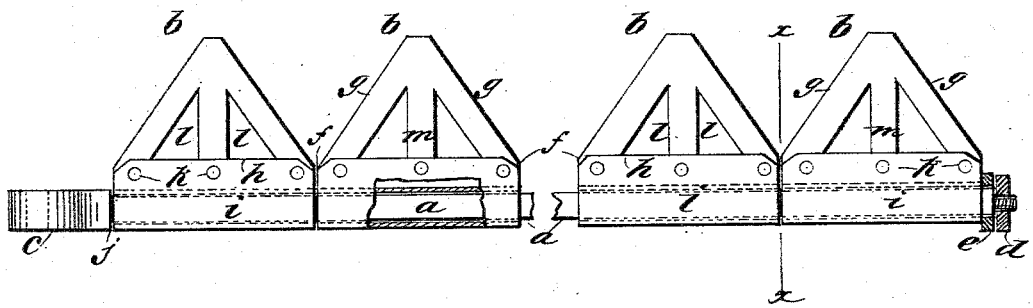
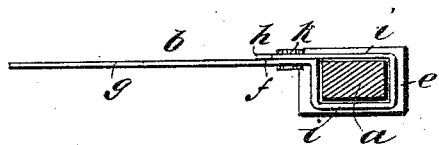
WITNESSES:
Francis McArdle
C. Sedgwick
INVENTOR:
J. M. Hamblin
BY Munn & Co
ATTORNEYS.

UNITED STATES PATENT OFFICE.

JOHN MEDDO HAMBLIN, OF SOUTH UNION, KENTUCKY.

MOWING-MACHINE KNIFE.

SPECIFICATION forming part of Letters Patent No. 305,813, dated September 30, 1884.

Application filed September 14, 1883. (Model.)

*To all whom it may concern:*

Be it known that I, JOHN M. HAMBLIN, of South Union, in the county of Logan and State of Kentucky, have invented a new and useful Improvement in Mowing - Machine Knives, of which the following is a full, clear, and exact description.

My invention relates to the knife-bars and knives of mowing and reaping machines, and has for its object to provide a light, strong, serviceable knife-bar and knives, which may be worked for a prolonged period without excessive gumming and by a comparatively small expenditure of power, and also to provide for the quick, easy, and accurate sharpening of the knives when dulled by use.

Reference is to be had to the accompanying drawings, forming part of this specification, in which similar letters of reference indicate corresponding parts in both the figures.

Figure 1 is a plan view of my improved knife-bar and knives, partly broken away and in section; and Fig. 2 is a cross-sectional elevation on the line $x\ x$, Fig. 1, and in larger size.

The drawings represent the knife-bar $a$ as broken away at the center, and showing but two knives or cutters, $b$, at opposite ends of the bar $a$.

The finger-bars and other parts of the complete sickle-bar are not shown, as these may be of the usual or any approved construction.

I make the knife-bar $a$ in the rectangular form shown, and with the usual eye, $c$, for attachment of the connecting-rod for its reciprocation through the fingers of the sickle-bar. A nut, $d$, threaded on the end of bar $b$, acts either directly or by an interposed washer, $e$, to bind the cutters $b$ firmly in place side by side on bar $a$ for its whole length, as shown. These knives $b$, I make of a thin sheet or plate of steel, the portion of which behind the back points, $f$, of the angular cutting-edges $g$ of the knives is of about a like width to the extreme back edge, $h$, of the knife-blank, which blank is bent downward, backward, upward, and forward to form the eye or socket $i$, shaped to snugly fit the flat-sided bar $a$, so that when the knives $b$ are slid upon the bar $a$ and clamped by the nut $d$ against each other and the opposite shoulder $j$ of bar $a$, said knives will be held with their reversely-inclined cutting-edges $g$ always in the same plane for the whole length of the bar $a$, so as to work smoothly and with the best effect. Any suitable rivet or other fastenings, $k$, may be employed to bind the back edge, $h$, of the knife $b$ firmly to the body portion of the knife. I cut away those portions of the knives $b$ back of their opposite cutting-edges $g$, as at $l$, leaving a central bar, $m$, for necessary stiffness of the knife, the rear edges of openings $l$ being about in a line with the folded-over rear edge, $h$, of the knife-blank. These openings $l$ serve to reduce the area of the flat faces of the knives $b$, so that they are less liable to be gummed up by the juices of the crop being mown, and as a consequence the knives will work freer and with less power than would knives devoid of these openings. It will be noted, also, that by making these knives $b$ separate from each other they may readily be sharpened with accurate bevel and continuity of both cutting-edges $g$ when removed from the bar $a$, which may easily and quickly be done by removing the nut $d$ and washer $e$ and sliding the knives $b$ off the end of the bar, and when sharpened the knives may as easily and quickly be replaced and clamped in working position by the nut, as above described.

It is obvious that by providing the knives $b$ with the eyes $i$ and holding them on the bar $a$ by the nut $d$ said bar $a$ is not weakened by holes made in or through it to receive bolts or screws, by which the cutters are secured in the common way, said eyes $i$ serving rather to re-enforce and strengthen the bar $a$, and permitting the parts to be made lighter and stronger, and assuring a light draft for the machine to which my improvements may be applied.

Having thus described my invention, I claim as new and desire to secure by Letters Patent—

1. In a harvester-knife, the shank bent to pass down in front of the knife-bar, then under and up around it, the end $h$ being made to lap over to or near to the point $f$, and then secured to the blade, substantially as shown and described.

2. As a new article of manufacture, a cutting-blade consisting of the blade $b$, formed with cutting-edges $g$, central bar, $m$, and openings $l$, and with its shank bent to form an angular box, $i\ e\ i$, and to overlap the blade to the point $f$, where it is firmly secured thereto, substantially as set forth.

JOHN MEDDO HAMBLIN.

Witnesses:
J. Q. TAYLOR,
JOHN McCUTCHEN, Jr.